United States Patent [19]

Schloman, Jr. et al.

[11] Patent Number: 4,616,068

[45] Date of Patent: Oct. 7, 1986

[54] POLYAMINE TREATED GUAYULE RESIN AND RUBBER COMPOSITIONS CONTAINING THE SAME

[75] Inventors: William W. Schloman, Jr., Stow; James A. Davis, Uniontown, both of Ohio

[73] Assignee: The Firestone Tire & Rubber Company, Akron, Ohio

[21] Appl. No.: 750,955

[22] Filed: Jul. 2, 1985

[51] Int. Cl.$^4$ .................... C08F 36/14; C08F 36/02
[52] U.S. Cl. ..................... 525/332.7; 525/332.5; 525/333.1; 528/930
[58] Field of Search ............ 525/333.1, 332.5, 351, 525/375, 381, 382, 332.7; 528/487, 492, 930

[56] References Cited

U.S. PATENT DOCUMENTS

| | | | |
|---|---|---|---|
| 1,296,469 | 3/1919 | Boggs | 525/332.5 |
| 1,753,184 | 4/1930 | Spence | 528/930 |
| 2,395,507 | 2/1946 | Sauser | 525/332.5 |
| 2,524,977 | 10/1950 | Holbrook et al. | 525/332.5 |
| 2,643,977 | 6/1953 | Hughes | 252/390 |
| 2,646,400 | 7/1953 | Hughes | 252/390 |
| 2,692,871 | 10/1954 | Pechukas | 528/490 |
| 4,124,750 | 11/1978 | O'Mahoney, Jr. | 525/332.5 |
| 4,434,266 | 2/1984 | Trivette, Jr. | 525/301 |
| 4,568,711 | 2/1986 | Kay et al. | 528/930 X |

OTHER PUBLICATIONS

Morris et al., "The Compounding of Guayule Rubbers", India Rubber World, 105(6), pp. 565-569, (1942).
R. W. Keller, D. S. Winkler, and H. L. Stephens, "Degradative Effects of Guayule Resin on Natural Rubber", vol. 54, No. 1, Mar.-Apr., 1981, from Rubber Chemistry and Technology, pp. 115-123.

*Primary Examiner*—Joseph L. Schofer
*Assistant Examiner*—F. M. Teskin
*Attorney, Agent, or Firm*—Daniel N. Hall

[57] ABSTRACT

Guayule-type resins are chemically treated with polyamine. The resulting composition is suitable as a rubber additive since it improves various physical properties of rubber compositions such as green strength, building tack, tear strength, hysteresis loss and the like.

18 Claims, No Drawings

4,616,068

POLYAMINE TREATED GUAYULE RESIN AND RUBBER COMPOSITIONS CONTAINING THE SAME

FIELD OF INVENTION

The present invention relates to guayule resins which are chemically treated with a polyamine. More specifically, it relates to polyamine crosslinked guayule resins which have high softening points and can be utilized as rubber additives.

PRIOR ART

U.S. Pat. No. 2,692,871 to Pechukas relates to the use of polyamines by coating finely divided silica with water miscible alkylene polyamine or by incorporating silica and the alkylene polyamine in a rubber composition. Although an improved reinforcing pigment is obtained, this patent fails to disclose the use of a guayule-type resin or the chemical treatment thereof with a polyamine.

U.S. Pat. No. 2,643,977 to Hughes relates to a corrosion inhibitor for treating petroleum oil-brine mixtures by reacting diethylenetriamine with an equimolar quantity of an aldehyde, heating to drive out the reaction to completion and further reaction of the polyamine-aldehyde reaction product with a further mol of aldehyde. Accordingly, this patent fails to disclose any utilization as a rubber additive of any chemical treatment of guayule resin with a polyamine.

U.S. Pat. No. 2,646,400 also to Hughes similarly relates to inhibiting corrosion of metals and to treating natural petroleum oil-brine mixtures to reduce their corrosive action by adding compositions produced by reacting a polyamine with an aldehyde of two or more carbon atoms. Formaldehyde is excluded. Accordingly, this patent does not disclose the preparation of a rubber additive, chemically treating guayule type resins with a polyamine, and the like.

The article "Degradative Effects of Guayule Resin on Natural Rubber," Keller, Winkler and Stephens, *Rubber Chemistry and Technology*, Vol. 54, No. 1, March-April 1981, presented at a meeting of the Rubber Division of The American Chemical Society, Los Vegas, Nev., May 20–23, 1980, describes some of the components of guayule resin and their effect on natural rubber.

SUMMARY OF INVENTION

It is therefore an aspect of the present invention to provide guayule resin chemically treated with a polyamine.

It is another aspect of the present invention to provide resinous polyamine derivatives, as above, which are useful as rubber additives.

It is a still further aspect of the present invention to provide resinous polyamine derivatives, as above, which increase the green strength and building tack of unvulcanized rubber compositions.

It is yet another aspect of the present invention to provide resinous polyamine derivatives, as above, which activate the cure of sulfur-vulcanized rubber compositions.

It is yet another aspect of the present invention to provide resinous polyamine derivatives, as above, which increase the tear strength and/or increase the hysteresis loss properties of vulcanized rubber compositions.

These and other aspects of the present invention will become apparent from the following detailed specification.

DETAILED DESCRIPTION OF INVENTION

According to the present invention, guayule or guayule-like resins are chemically treated with polyamines to form derivatives thereof which are at least useful in various rubber compositions. Among the plant materials that can be used as sources of guayule resins and guayule-like or guayule type resins are a large number of plant species bearing rubber and rubber-like hydrocarbons. These include particularly guayule itself, gopher plant (*Euphorbia lathyris*), mariola (*Parthenium incanum*), rabbitbrush (*Chrysothamnus nauseosus*), candelilla (*Pedilanthus macrocarpus*), Madagascar rubber-vine (*Cryptostegia grandiflora*), milkweeds (*Asclepias syriaca, speciosa, subulata,* et al), goldenrods (*Solidago altissima, graminifolia, rigida,* et al), pale Indian plantain (*Cacalia atriplicifolia*), Russian dandelion (*Taraxacum kok-saghyz*), mountain mint (*Pycnanthemum incanum*), American germander (*Teucreum canadense*) and tall bellflower (*Campanula americana*). Many other plants which produce rubber and rubber-like hydrocarbons are known, particularly among the Asteraceae (Compositae), Euphorbiaceae, Campanulaceae, Labiatae, and Moraceae families.

Guayule resin prepared from such plants is generally extracted with an organic polar solvent. Such polar solvents include alcohols having from 1 to 8 carbon atoms, for example methanol, ethanol, isopropanol, and the like; esters having from 3 to 8 carbon atoms such as the various formates, the various acetates, and the like; and ketones having from 3 to 8 carbon atoms, such as acetone, methyl ethyl ketone, and the like. Ethers can also be utilized such as those having from 2 to 8 carbon atoms including dimethyl ether, diethyl ether, and the like, as well as cyclic ethers having from 4 to 8 carbon atoms such as tetrahydrofuran. The preferred extraction solvent is acetone or ethyl alcohol. The resin generally constitutes about 6 to about 15 percent of the dry weight of the plant. The resin can be obtained by any conventional extraction method such as solvent extraction of the whole shrub, of the leaves or woody tissue, or the like. Generally a suitable crush or grinding step is utilized, for example, a hammermill. The organic polar solvent can then be added to the crushed guayule plant material to extract the resin therefrom. Naturally, other common or conventional resin extraction methods can be utilized.

Once the guayule resin has been extracted, desirably it is physically processed as by vacuum or steam devolatilization, extraction with a hydrocarbon solvent such as hexane, or the like. Devolatilization removes low boiling ols which often cause undesirable odors and excessive of softening when present. Suitable hydrocarbons include the alkanes having from 4 to about 9 carbon atoms such as heptane, the cycloalkanes having from about 5 to about 10 carbon atoms such as cyclohexane, and the like. The hydrocarbon extraction step allows separation of less-soluble polar compounds which are removed as an insoluble residue. The hydrocarbon insoluble portion of the resin is recovered for chemical treatment with a polyamine. Combinations of various physical treatments can also be utilized.

The polyfunctional amines or the polyamines which are suitable in the present invention generally can be represented by the formula

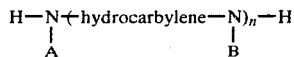

where the hydrocarbylene portion has from 2 to about 20 carbon atoms. The number repeating units, that is "n" is an integr of from 1 to about 10, and preferably from 1 to 4. Thus, the polyamine can be a oligomer. A or B, independently, can be substantially hydrocarbon or hydrogen. Desirably, A or B, independently, are hydrogen or an alkyl having from 1 to about 30 carbon atoms, with from about 1 to about 8 carbon atoms being desirable. The hydrocarbylene group can generally be an aliphatic having from about 2 to about 20 carbon atoms and preferably from about 2 to about 12 carbon atoms. A desirable hydrocarbylene is an alkylene having from about 2 to about 20 carbon atoms with from about 2 to about 12 carbon atoms being preferred. Another suitable hydrocarbylene is a cycloalkylene having from about 4 to about 20 carbon atoms with from about 4 to about 12 carbon atoms being preferred. Various hydrocarbylene aromatic compounds include phenylene, naphthalene and the like having from about 6 to about 20 carbon atoms with from about 6 to about 10 carbon atoms being preferred. Additionally, aromatic substituted alkyl or alkyl substituted aromatic groups can be utilized having from 7 to about 20 carbon atoms with from 7 to about 12 carbon atoms being preferred. Specific examples of suitable polyamines include the ethyleneamine family, that is ethylenediamine (EDA), diethylenetriamine (DETA), triethylenetetramine (TETA), tetraethylenepentamine (TEPA), and pentaethylenehexamine (PEHA). The propyleneamine family of products comprises 1,2-propanediamine (1,2-PDA), 1,3-propanediamine (1,3-PDA), iminobispropylamine (IBPA), dimethylaminopropylamine (DMAPA) and the like. Examples of other alkyleneamines include the butyleneamines, pentyleneamines, hexyleneamines, heptyleneamines, octyleneamines, other polymethyleneamines, and also the cycic and the higher homologues of such amines such as amino substituted terpenes and amino-alkyl-substituted piperazines. They are exemplified specifically by: propylenediamine, decamethylenediamine, octamethylenediamine, di(heptamethylene)triamine, tripropylenetetramine, trimethylenediamine, 1,3-bis(2-aminoethyl)imidazoline and 1,4-bis(2-aminoethyl)piperazine. Higher homologues such as are obtained by condensing two or more of the above-illustrated alkylene amines likewise are useful. Examples of cycloalkylene amines include 1,2-diaminocyclohexane, 1,3-cyclohexanebis(methylamine), isophoronediamine, menthanediamine (MDA), 4,4'-methylenebis(cyclohexylamine). Examples of aromatic polyamines include p-phenylenediamine (PPDA), m-phenylenediamine benzidine, 2,4-diaminotoluene, ethylenedianiline, 1,5-diaminonaphthalene, 1,8-diaminonaphthalene, o-tolidine, methylenedianiline, and the like. Examples of highly preferred polyamines include EDA, DETA, TETA, TEPA, PEHA, isophoronediamine, MDA hexamethylenediamine, and iminobispropylamine.

In addition to the above polyamines of the present invention, various sulfur-containing polyamines can also be utilized such as those having the following formulas

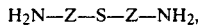

and

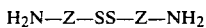

The "Z" group is a hydrocarbylene having from 2 to 20 carbon atoms with from 2 to 12 carbon atoms being preferred. Although Z can be an aliphatic, e.g. alkyl, or an alkyl substituted aromatic group, an aromatic group is preferred. Examples of such sulfur-containing compounds include 4,4'-thiodianiline, and aminophenyl sulfone.

The amount of the polyfunctional amines as set forth above which is utilized to treat guayule-type resins is from about 3 parts to about 30 parts by weight, desirably from about 5 to about 20 parts and preferably from about 7 parts to about 10 parts by weight of polyamine per 100 parts by weight of said guayule-type resin. Generally, the amount of polyfunctional amine is an effective amount to provide a reactant product imparting improved properties when added to rubber composition. Such an effective amount typically is such to provide a polyamine-crosslinked resin product having from about 1 to about 10 percent total nitrogen and preferably from about 1 to about 5 percent total nitrogen by weight.

The guayule-type resin is chemically treated by reacting it with the polyamine, generally in a hydrocarbon solvent, at a temperature from about 60° C. to about 200° C., and more desirably from about 65° C. to about 130° C. Alternatively, the reaction can be carried out in the absence of a solvent or under a vacuum, that is at pressures of from about 0.05 to about 30.0 MPa and preferably from 3.0 to 15.0 MPa. Naturally, combination of various polyamines can be utilized including the sulfur-containing polyamines. Examples of suitable hydrocarbon solvents include aromatic solvents such as benzene, toluene, xylene, and the like. Although not necessary, suitable solvents include those which form azeotropic solutions with water. Inasmuch as a major component of the guayule-type resins are triterpene ketoalcohols and various free acids, the reaction proceeds by condensation to produce ketimine, enamine, and amide derivatives, with water being formed as a by-product. Desirably, the reaction mixture is maintained at a temperature sufficient such that water is removed by azeotropic distillation although such is not required. The reaction mixture can be agitated by mechanical means or through the use of a sparge. A nitrogen or steam sparge also serves to remove solvent as well as volatile by-products during as well as at the conclusion of the reaction. Inasmuch as not all of the chemical components of the guayule-type resins react with the polyamines, the nitrogen or steam sparge serve to remove such nonreactive products and purify the resin. The end product is generally thought to be guayule resin components crosslinked by the polyamine.

The polyamine-crosslinked guayule resin desirably has a ring-and-ball softening point above about 70° C., as measured using ASTM method E28-67. Softening points below this temperature usually make handling difficult. As shown in the examples below, the physical properties of the resinous reaction products may be varied by manipulation of the starting materials and the processing conditions. Specifically, a higher molecular weight polyamine, where n is 4, such as is employed in Example 2, affords a product having a higher softening point than does a polyamine where n is 2, such as is employed in Example 4. Higher softening points can also be obtained by condensing a polyamine with the guayule resin polar fraction, such as is employed in Example 3, rather than with the unfractionated guayule resin, such as is employed in Example 2. Lastly, higher softening points can also be obtained by the use of a steam sparge treatment of the resinous reaction product, wherein the steam is at a temperature of between 150°-325° C., preferably between 200°-250° C. The steam sparge, which is introduced after the reaction mixture is desolventized, is continued until approximately 20-200 parts of distillate is obtained for every 100 parts of resin. The distillate, in addition to containing condensed steam, is composed of low molecular weight reaction products and possibly unreacted diamine and guayule resin components. Typically, about 2-25 parts of volatile by-products are removed for every 100 parts of resinous product. Accordingly, the product of Example 1 had a ring-and-ball softening point of 61° C. after distillation of 12.5 parts of volatile by-products for every 100 parts of resinous product, whereas the product of Example 2 had a ring-and-ball softening point of 74° C. after distillation of 17 parts of volatile by-products for every 100 parts of resinous product.

Two uses for the products made from guayule resin are as green strength promoters and tackifiers for rubber compositions. Green strength is a measure of the ability of the unvulcanized rubber to resist deformation. Tack, or more specifically building tack, is a measure of the ability of two unvulcanized rubbers to stick together during fabrication. Green strength and building tack are significant properties in handling unvulcanized materials. It is often desirable that such agents are preferably added to natural and synthetic rubbers to increase inherent green strength and tack or correct any deficiencies in green strength and tack properties.

Another use for the products made from guayule resin is as cure activiators in sulfur-vulcanized rubber compositions. Cure activation is effected by reducing the time to the onset of vulcanization, the "scorch time" ($t_s2$), or the time to optimum cure, the "cure time" ($t'_c90$), or both. A measure of the level of cure activation is the cure rate index, defined as $100/(t'_c90-t_s2)$. It is often desirably that such agents are preferably added to natural and synthetic rubber compositions to increase the cure rate index.

Another use for the products made from guayule resin is to increase the tear strength of vulcanized rubber compositions. Tear strength is the force necessary to propagate a crack or tear under stress. It is often desirably that reinforcing agents are preferably added to natural and synthetic rubbers to increase tear strength.

Another use for the products made from guayule resin is to reduce the dynamic heat loss (hysteresis loss) in vulcanized rubber compositions. Hysteresis loss, defined as the ratio of the loss modulus to the storage modulus of a rubber composition, is a measure of the energy dissipated during deformation or flexing. In passenger and truck tires, increased hysteresis loss in the constituent vulcanized rubber compositions contributes to the undesirable property known as rolling resistance.

The amount of the polyamine treated guayule type resin, that is the reaction product thereof which is generally added to a rubber compound to improve various properties thereof such as those set forth hereinabove is from about 0.5 to about 20 parts by weight, desirably from about 1 to about 10 parts by weight and preferably from about 1 to about 3 parts by weight per 100 parts by weight of rubber.

Generally any conventional type of rubber compound or formulation can be utilized as well known to the art. Examples of suitable types of rubber include natural rubber, rubber made from diene monomers having from 4 to 12 carbon atoms, including isoprene, butadiene, and the like; rubbers made from interpolymers of diene monomers have from 4 to 12 carbon atoms such as isoprene and butadiene, and the like; rubber copolymers made from diene monomers having from 4 to 12 carbon atoms with other copolymerizable monomers as for example, vinyl substituted aromatics having from 8 to 12 carbon atoms, i.e. styrene, alpha-methylstyrene; or other monomers such as acrylic ester, methyl isopropenyl ketone, isobutylene, acrylonitrile or an unsaturated carboxylic acid; halogenated rubber such as polychloroprene, chlorosulfonated polyethylene, or fluororubbers; terpolymers of one or more monolefins with a monomer which confers unsaturation on the interpolymer, for example the various types of EPDM terpolymers, butyl rubbers, halobutyl rubbers, norbornene rubbers, polysulfide rubbers, sulfur vulcanizable polyurethane rubber; and blends thereof. Additionally, blends of the above rubbers containing a minor portion of SBS or SIS (styrene and butadiene or isoprene) copolymers can also be used. Additionally, one or more of the above synthetic rubbers can be blended with the various amounts of natural rubber as by example from about 10 percent to about 95 percent of natural rubber.

Various amounts of conventional or common rubber additives can be added to the rubber in conventional amounts as well known to the art or as set forth in the Vanderbilt Rubber Handbook, copyright 1978. Thus, various fillers and reinforcing agents such as carbon black or silica can be utilized. Additionally, various processing oils such as aromatic, paraffinic or naphthenic types can be utilized. Other common additives are the metal salts such as zinc oxide and the like. Fatty acids can also be utilized such as stearic acid. Still other additives include accelerators such as the various sulfenamides and the various antioxidants such as hindered phenols and substituted p-phenylenediamines.

Accordingly, the polyamine crosslinked guayule resin of the present invention can be utilized wherever the above properties are desired such as in tires, including passenger tries, truck tires and off-the-road tires, hoses, conveyor belts, power and transmission belts, fuel or chemical tank linings, thermal insulation, flotation gear, automotive floor mats, mud flaps, rubber tiles, motor mounts, draft gear pads, gaskets, seals, O-rings, bumpers, roofing membranes, tank track pads, shock absorbers, and other mechanical rubber goods.

The invention will be better understood by the examples set forth below which illustrate both the preparation and use of the polyamine-treated guayule type resin products in a typical rubber compounding recipe.

The green strength properties of the unvulcanized compounded stocks were determined using an Instron Model TTD Tester. Green strengths are reported as uncured tensile strength. Building tack properties were also determined on the Instron Tester. Test pieces were nylon fabric-backed plaques which had been pressed together 15 min. at 93° C. before measurement. Table II illustrates the improvements in tack and green strength obtained with the products of Examples 1 through 6.

Cure characteristics of the compounded stocks were determined by means of a Monsanto Oscillating Disk Curemeter (ASTM method D2084-81). The cure data summarized in Table III show that the diamine-crosslinked resin products decreased both the scorch time and cure time. As a result, the cure rate index was increased. This behavior is typical of cure activators.

Tear properties of cured compounded stock specimens cut with die B were determined in accordance with ASTM method D624-81. Data summarized in Table IV show that the diamine-crosslinked resin products increased compound tear strength.

Dynamic properties of the cured compounded stocks were evaluated as the hysteresis loss factor. This was determind at 23° C. using the well-known MTS Model 830 elastomer test system. Table V illustrates that the products of Examples 1,2,4,5, and 6 decrease hysteresis loss.

EXAMPLE 1

In a reactor equipped with a mechanical stirrer and a Dean-Stark distilling receiver with reflux condenser, 300 parts of guayule resin and 150 parts of toluene were heated to 110° C. To the heated resin solution was added 40 parts of TEPA. The mixture was refluxed until 7 parts of water had been collected by azeotropic distillation. Desolventization with a nitrogen sparge to 225° C. was followed by a steam sparge at 200°-210° C. until 37 parts of volatile by-products had been distilled. The total distillate yield was about 300 parts. By this means, 293 parts of a brown resin having a ring-and-ball softening point of 61° C. was obtained.

EXAMPLE 2

Following the procedure of Example 1, 300 parts of guayule resin and 40 parts of TEPA were reacted until 7 parts of water had been collected. After desolventization, a steam sparge at 210°-225° C. was used to distill 48 parts of volatile by-products. The total distillate yield was about 268 parts. In this manner, 282 parts of a brown resin having a ring-and-ball softening point of 74° C. and a total nitrogen content of 4.4 percent was obtained.

EXAMPLE 3

Following the procedure of Example 1, 200 parts of the hexane-insoluble fraction of guayule resin and 26.5 parts of TEPA were reacted until 5 parts of water had been collected. After desolventization, a steam sparge at 200°-225° C. was used to distill 8 parts of volatile by-products. The total distillate yield was about 58 parts. In this manner, 195 parts of a brown resin having a ring-and-ball softening point of 92° C. and a total nitrogen content of 4.6 percent was obtained.

EXAMPLE 4

Following the procedure of Example 1, 300 parts of guayule resin and 22 parts of DETA were reacted until 7 parts of water had been collected. After desolventization, a steam sparge at 200°-210° C. was used to distill 28 parts of volatile by-products. The total distillate yield was about 128 parts. In this manner, 276 parts of a brown resin having a ring-and-ball softening point of 69° C. and a total nitrogen content of 2.8 percent was obtained.

EXAMPLE 5

Following the procedure of Example 1, 300 parts of guayule resin and 36 parts of MDA were reacted until 2 parts of water had been collected. After desolventization, a steam sparge at 200°-225° C. was used to distill 31 parts of volatile by-products. The total distillate yield was about 130 parts. In this manner, 288 parts of a brown resin having a ring-and-ball softening point of 72° C. and a total nitrogen content of 1.4 percent was obtained.

EXAMPLE 6

Following the procedure in Example 1, 300 parts of guayule resin and 23 parts of PPDA were reacted until 6 parts of water had been collected. After desolventization, a steam sparge at 225°-245° C. was used to distill 45 parts of volatile by-products. The total distillate yield was about 195 parts. In this manner, 262 parts of a brown resin having a ring-and-ball softening point of 80° C. and a total nitrogen content of 1.9 percent was obtained.

TABLE I

| RUBBER TEST RECIPE | |
|---|---|
| Ingredients | Parts by Weight |
| 1. NR | 50 |
| 2. SBR | 50 |
| 3. HAF Carbon Black | 50 |
| 4. Medium aromatic process oil | 3 |
| 5. Zinc oxide | 3 |
| 6. Stearic acid | 2 |
| 7. Antioxidant (substituted p-phenylene diamine) | 1 |
| 8. Sulfenamide accelerator | 1.2 |
| 9. Sulfur | 2 |
| 10. Polyamine-crosslinked guayule resin | Variable |

TABLE II

TACKIFYING PROPERTIES AND GREEN STRENGTH DATA

| Resin Example No. | Level, phr | Building Tack, kN/m | Peak Green Strength, MPa |
|---|---|---|---|
| Control | 0 | 2.23 | 0.75 |
| 1 | 1 | 2.36 | 1.15 |
| 1 | 3 | 2.89 | 1.71 |
| 1 | 6 | 3.32 | 1.67 |
| 2 | 1 | 2.53 | 1.27 |
| 2 | 3 | 2.98 | 1.40 |
| 3 | 1 | 2.62 | 1.11 |
| 3 | 3 | 2.89 | 1.53 |
| 4 | 1 | 2.89 | 1.00 |
| 4 | 3 | 2.58 | 0.98 |
| 5 | 1 | 2.98 | 0.79 |
| 5 | 3 | 2.10 | 0.79 |
| 6 | 1 | 2.01 | 0.76 |
| 6 | 3 | 2.62 | 1.16 |

TABLE III

CURE DATA, 150° C.

| Resin Example No. | Level, phr | $t_s2$, min | $t'_c90$, min | CRI | $M_{HR}$, dN m |
|---|---|---|---|---|---|
| Control | 0 | 9.6 | 16.3 | 14.9 | 36.0 |
| 1 | 1 | 9.1 | 15.8 | 14.9 | 42.7 |
| 1 | 3 | 3.5 | 7.5 | 25.0 | 45.6 |
| 1 | 6 | 2.3 | 7.3 | 20.0 | 43.6 |

TABLE III-continued

CURE DATA, 150° C.

| Resin Example No. | Level, phr | $t_s2$, min | $t'_c90$, min | CRI | $M_{HR}$, dN m |
|---|---|---|---|---|---|
| 2 | 1 | 7.8 | 13.8 | 16.7 | 43.6 |
| 2 | 3 | 4.4 | 8.6 | 23.8 | 42.4 |
| 3 | 1 | 7.6 | 13.3 | 17.5 | 43.3 |
| 3 | 3 | 4.6 | 8.8 | 23.8 | 43.7 |
| 4 | 1 | 6.0 | 11.9 | 16.9 | 46.7 |
| 4 | 3 | 4.5 | 8.1 | 27.8 | 45.4 |
| 5 | 1 | 8.3 | 14.0 | 17.5 | 46.3 |
| 5 | 3 | 8.0 | 13.2 | 19.2 | 45.5 |
| 6 | 1 | 8.0 | 13.9 | 16.9 | 46.6 |
| 6 | 3 | 7.5 | 12.6 | 19.6 | 45.2 |

TABLE IV

CRESCENT TEAR DATA*

| Resin Example No. | Level, phr | Tear Strength kN/m |
|---|---|---|
| Control | 0 | 49.6 |
| 1 | 1 | 52.6 |
| 1 | 3 | 57.8 |
| 1 | 6 | 58.5 |
| 2 | 1 | 51.6 |
| 2 | 3 | 54.5 |
| 3 | 1 | 52.1 |
| 3 | 3 | 54.0 |
| 4 | 1 | 56.4 |
| 4 | 3 | 51.7 |
| 5 | 1 | 50.6 |
| 5 | 3 | 53.0 |
| 6 | 1 | 54.5 |
| 6 | 3 | 51.5 |

*Stocks cured 30 min. at 150° C.

TABLE V

DYNAMIC PROPERTIES DATA*

| Resin Example No. | Level, phr | Hysteresis Loss Factor |
|---|---|---|
| Control | 0 | 0.181 |
| 1 | 1 | 0.208 |
| 1 | 3 | 0.171 |
| 1 | 6 | 0.177 |
| 2 | 1 | 0.170 |
| 2 | 3 | 0.167 |
| 3 | 1 | 0.212 |
| 3 | 3 | 0.200 |
| 4 | 1 | 0.171 |
| 4 | 3 | 0.174 |
| 5 | 1 | 0.170 |
| 5 | 3 | 0.183 |
| 6 | 1 | 0.163 |
| 6 | 3 | 0.176 |

*Stocks cured 30 min. at 150° C.

As apparent from the above data, use of the polyamine crosslinked guayule-type resins of the present invention resulted in significant increases in building tack, green strength, and tear strength. Moreover, the time to onset vulcanization and cure time as well as the cure rate index was reduced as was generally the hysteresis loss factor. Accordingly, the guayule treated resin of the present invention imparts favorable properties when utilized in association with rubber elastomers.

While in accordance with the patent statutes, a best mode and preferred embodiment has been set forth, it is to be understood that numerous variations, combinations, and permutations can be made within the scope of the present invention and accordingly the invention is set forth by the scope of the attached claims.

What is claimed is:

1. A composition of matter, comprising: guayule resin chemically crosslinked by treating with a polyamine or a sulfur-containing polyamine, said polyamine having the formula

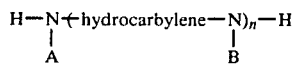

wherein A or B, independently, is hydrogen or hydrocarbon having from 1 to 30 carbon atoms, wherein said hydrocarbylene has from 2 to 20 carbon atoms, and wherein n is an integer from 1 to 10, and said sulfur-containing polyamine having the formula

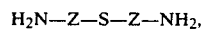

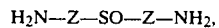

and

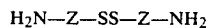

wherein said Z is a hydrocarbylene having from 2 to 20 carbon atoms.

2. A composition according to claim 1, wherein said guayule resin is treated with an effective amount of said polyamine or said sulfur-containing polyamine, to impart improved properties when utilized with a rubber composition.

3. A composition of matter according to claim 2, wherein the amount of said polyamine or said sulfur-containing polyamine is from 3 parts to about 30 parts by weight per 100 parts by weight of said resin, and wherein said Z hydrocarbylene is an alkyl substituted aromatic or an aromatic having from 6 to 12 carbon atoms.

4. A composition according to claim 3, wherein said A or B, independently, is hydrogen or an alkyl having from 1 to 30 carbon atoms, wherein said hydrocarbylene is an aliphatic having from 2 to about 20 carbon atoms, a cycloaliphatic having from 4 to about 20 carbon atoms, an aromatic having from 6 to about 20 carbon atoms, or an alkyl substituted aromatic having from 7 to about 20 carbon atoms.

5. A composition according to claim 4, wherein said chemically treated guayule resin has a softening point of at least 70° C. according to ASTM method E 28-67, and wherein said hydrocarbylene is an alkylene having from 2 to 12 carbon atoms, a cycloalkylene having from 4 to 12 carbon atoms, phenylene, naphthylene, or an alkyl substituted aromatic having from 7 to 12 carbon atoms.

6. A composition according to claim 5, including carrying out said chemical treatment at a temperature from about 60° C. to about 200° C., wherein n is 1 to 4, and wherein said A or B, independently is hydrogen or an alkyl having from 1 to 8 carbon atoms.

7. A composition according to claim 5, wherein said guayule resin is treated with said polyamine, and wherein the amount of said polyamine is from about 5 to about 20 parts by weight per 100 parts by weight of said resin.

8. A composition according to claim 7, wherein the amount of said polyamine is from about 7 parts to about 10 parts by weight per 100 parts by weight of said resin, and wherein said A or B is hydrogen.

9. A composition according to claim 2, wherein the amount of nitrogen in said chemically treated guayule resin is from about 1 percent to about 10 percent total nitrogen by weight.

10. A composition according to claim 5, wherein the amount of nitrogen in said chemically treated guayule resin is from about 1 percent to about 10 percent total nitrogen by weight.

11. A rubber composition comprising an effective amount of said composition of claim 1 to impart improved properties thereto.

12. A rubber composition containing from about 0.5 to about 20 parts by weight of the composition of claim 1 per 100 parts by weight of the rubber composition.

13. A rubber composition according to claim 12, wherein the amount of said polyamine or said sulfur-containing polyamine is from 3 parts to about 30 parts by weight per 100 parts by weight of said resin;
   wherein said A or B, independently, is hydrogen or an alkyl having from 1 to 30 carbon atoms; and
   wherein said hydrocarbylene is an aliphatic having from 2 to about 20 carbon atoms, a cycloaliphatic having from 4 to about 20 carbon atoms, an aromatic having from 6 to about 20 carbon atoms, or an alkyl substituted aromatic having from 7 to about 20 carbon atoms, and
   wherein said Z hydrocarbylene is an alkyl substituted aromatic or an aromatic having from 6 to 12 carbon atoms.

14. A composition according to claim 13, wherein said chemically treated guayule resin has a softening point of at least 70° C. according to ASTM method E 28-67;
   wherein said hydrocarbylene is an alkylene having from 2 to 12 carbon atoms, a cycloalkylene having from 4 to 12 carbon atoms, phenylene, naphthylene, or an alkyl substituted aromatic having from 7 to 12 carbon atoms; wherein "n" is from 1 to 4, and wherein A or B, independently, is hydrogen or an alkyl having from 1 to 8 carbon atoms, and
   wherein the amount of said guayule resin treated with said polyamine is from about 1 part to about 10 parts by weight based upon 100 parts by weight of said rubber composition.

15. A rubber composition according to claim 14, wherein the amount of said polyamine is about 5 parts to about 20 parts by weight per 100 parts by weight of said resin, and wherein A or B is hydrogen.

16. A tire having as a component thereof the rubber composition of claim 13.

17. A tire having as a component thereof the rubber composition of claim 14.

18. A mechanical rubber good having as a component thereof the rubber composition of claim 14.

* * * * *